Patented Oct. 10, 1939

2,175,790

UNITED STATES PATENT OFFICE 2,175,790

SMOKE SCREEN MATERIAL AND PROCESS OF MAKING

James F. Booker, Nutley, and Roger L. Annis, Newark, N. J., assignors to Intermetal Corporation, Newark, N. J., a corporation of Delaware No Drawing. Application April 8, 1938, Serial No. 201,008

14 Claims. (Cl. 252—1)

This invention relates to a smoke screen material and process of making the same, and more particularly to a process of making a volatile material which may be prepared in solid form and which will volatilize and form a dense cloud of smoke in the presence of moist air, and the product resulting from the process.

Materials which have been employed for forming smoke screens are titanium tetrachloride ($TiCl_4$) and stannic chloride ($SnCl_4$). These compounds are volatile, and hydrolize in the presence of moist air to produce particles forming a dense cloud. These materials, however, have certain disadvantages. They are liquid at ordinary temperatures and difficulty is encountered in controlling the density of the smoke produced. A liquid material is undesirable for charging shells, as the liquid therein tends to slop and thereby cause the projectile to follow an uneven trajectory. Also the liquid materials sink into the ground when the shell is detonated so that their smoke producing power is largely lost. The smoke produced depends, therefore, upon the nature of the surface upon which the liquid is splashed. In addition to the above disadvantages, it is difficult to properly charge shells, hand grenades, or other containers suitable for laying smoke screens, with a liquid. The only solid material currently used for producing smoke screens is phosphorus. However, phosphorus is extremely inflammable and produces fires where fires are not wanted.

In accordance with the present invention, a solid smoke screen material which is entirely non-inflammable is provided. This material can be prepared so as to have substantially the same smoke producing power as liquid titanium tetrachloride. The solid material stays properly packed in a shell and will not sink into the ground so as to be wasted, as is the case with the liquid smoke screen material. The material may be in cake or powdered form, and can be detonated into solid particles of controlled size so as to predetermine the period of smoke production and the density of the smoke produced.

The smoke screen producing substances of the present invention may be varied in consistency from a muddy liquid or a heavy paste to a dry solid which may be in either powdered or cake form but finds its chief utility when prepared in a solid or substantially solid condition. Also, the composition of the material can be varied so as to control the rate of smoke production and, therefore, the density of the resulting cloud. In addition, the solid material may be employed as a base for distributing other volatile liquids which modify the properties of the smoke screen. For example, the smoke screen may be given a dark color, made toxic or given the properties of a tear gas by incorporating suitable compounds, preferably volatile liquids, into the smoke screen material, preferably during formation of the solid material.

It is, therefore, an object of the present invention to provide a novel smoke screen material.

Another object of the invention is to produce a smoke screen material which may be in solid form and which will volatilize and react with moist air to form a dense cloud of smoke.

Another object of the invention is to provide a non-inflammable smoke screen material which may be produced in solid form.

The present invention contemplates the production of volatile double chlorides which may be stored and shipped in solid form and which are capable of forming dense clouds of smoke when exposed to moist air. We have discovered that double chlorides of sulfur and certain other elements, for example, tin or titanium, are capable of forming such clouds. Certain double chlorides of sulfur and one of the above mentioned metals are solid materials which are sufficiently stable to be handled and kept in closed containers but which will volatilize and form a cloud in the same manner as the liquid chlorides of the metals.

We have discovered that these materials may contain an excess of either sulfur chlorides or the metal chlorides and still remain in solid form, although extreme excesses of either of these chlorides will result in the material being in the form of a paste or muddy liquid. The excess liquid chlorides appear to be mechanically retained by the solid double chloride. Also, we have discovered that other volatile liquids may be incorporated into the solid material without destroying its stability or solid consistency. It is these properties of the solid material which enable the characteristics of the smoke screen to be varied within wide limits.

In general the more metal chloride in the product, the more rapid the rate of smoke production, and conversely an excess of sulfur chlorides or other volatile liquid reduces the rate of smoke production. The amount of chlorine in combination with the sulfur may also be varied within limits in the solid material. In general, lesser amounts of chlorine in combination with the sulfur increase the rate of smoke production. By varying the process by which the material is produced, controlled excess of either of the metal or sulfur liquid chlorides may be obtained in the finished product and the amount of other volatile liquids contained therein varied so that the rate and period of smoke production and the characteristics of the cloud can be controlled.

It is, therefore, another object of the invention to provide a novel process of producing volatile double chlorides of sulfur and a metal in solid form in which liquid volatile compounds are contained.

Another object of the invention is to provide a solid material capable of producing a dense smoke screen having a dark color.

Another object of the invention is to provide a solid material capable of producing a smoke screen in which is contained a toxic or tear gas.

Another object of the invention is to provide a process of producing solid double chlorides of sulfur and a metal in which an excess of chlorides of either sulfur or a metal are retained.

Another object of the present invention is to provide a process of making a smoke screen material by which the rate and period of smoke production as well as the characteristics of the resultant screen may be varied.

A further object of the invention is to provide a smoke screen material including a volatile metallic chloride and a sulfur chloride in chemical combination.

In making the smoke screen material, for example, a material containing titanium, a mixture of sulfur or sulfur monochloride with titanium tetrachloride may first be prepared. No reaction apparently takes place, and the resulting product is a liquid or a liquid with solid sulfur suspended therein. Upon saturation with chlorine, for example, by bubbling chlorine therethrough, solidification or the formation of a heavy paste or muddy liquid occurs, depending upon proportions of sulfur or sulfur chloride to metal tetrachloride. By employing the sulfur or sulfur chlorides and the metal tetrachloride in proper proportions, solidification is effected. This solidification of the whole mass of the material has been found to occur over a considerable range of sulfur to metal ratios.

The solid material may also be prepared by mixing proper proportions of metal tetrachloride with a liquid sulfur chloride containing large amounts of sulfur dichloride or tetrachloride. In this case solidification occurs almost immediately, and no addition of further chlorine is necessary although further addition of chlorine will raise the chlorine in combination with the sulfur to a maximum of approximately $SCl_4$. The latter product loses chlorine rapidly, even if kept in a closed container, resulting in building up a considerable chlorine pressure in such container. This loss of chlorine occurs until the chlorine in combination with the sulfur approaches $SCl_3$ and apparently stabilizes in the neighborhood of $SCl_{3.3}$. Some solid material is produced whenever the chlorine in combination with sulfur is greater than corresponding to $SCl$ and if approximately equal molecular proportions of titanium and sulfur are present, a solid product is obtained with the sulfur-chlorine ratio as low as $SCl_{1.5}$.

The above factors indicate that $TiCl_4S_2Cl_2$ is not formed or, if formed, is a liquid. Also $TiCl_4SCl_2$ and $TiCl_4SCl_4$ are apparently solid compounds. $TiCl_4SCl_4$ is evidently unstable and loses chlorine. The fact that chlorine loss ceases or becomes very slow when the chlorine in combination with sulfur approaches $SCl_3$ indicates the probable formation of a definite solid compound $TiCl_4SCl_3$. The product remains solid or substantially solid even if an excess of the titanium tetrachloride or any of the liquid sulfur chlorides are present, such that the solid product may be empirically expressed as $TiCl_4 \cdot xSCl_y$, in which $x$ and $y$ can vary so long as the excess of $TiCl_4$ or any of the liquid sulfur chlorides adsorbed by the solid double chlorides is not sufficient to destroy the solid nature of the product. The liquid content absorbed in the solid or substantially solid material may in some instances be approximately 50% of the total. For a stable solid product, $x$ can vary between approximately 1.5 and 3.3. For the extreme values of $x$, $y$ must be at least as great as 2 and for low values of $y$, $x$ must be approximately unity. Thus stable solid products have been prepared which can be expressed as

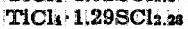
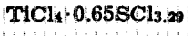

$$TiCl_4 \cdot 1.02SCl_{1.8}$$
$$TiCl_4 \cdot 1.29SCl_{2.28}$$
$$TiCl_4 \cdot 0.65SCl_{3.29}$$

The above expressions are not to be regarded as formulae of definite compounds, but are empirical expressions for solid mixtures of solid double chlorides and liquid chlorides. The empirical expressions can be generalized to

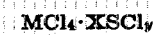

$$MCl_4 \cdot XSCl_y$$

where M represents one or a mixture of metals such as titanium or tin which form a tetrachloride combining with a sulfur chloride to form a volatile solid.

The solid product can also be expressed as $MCl_4 \cdot SCl_z + A$ in which $z$ can range between 2 and 4 and A is a volatile liquid absorbed in the solid compound or mixture of solid compounds represented by $MCl_4 \cdot SCl_z$. Thus A can be $TiCl_4$, $SnCl_4$, $S_2Cl_2$, $SCl_2$, $SCl_4$ or their equivalents or may, for example, be such volatile liquid compounds as $VOCl_3$, $AsCl_3$ or

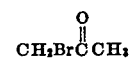

$$CH_3Br\overset{O}{\underset{\|}{C}}CH_3$$

or any mixture of two or more of these materials which do not react to form a solid compound. For example, $TiCl_4$ or $SnCl_4$ would react with $SCl_2$ or $SCl_4$, if present, to form the solid compound. As stated above, the liquid represented by A and absorbed in the solid compound may, in some cases, be as great as 100% based on the weight of the solid compounds. That is, the material may contain as high as 50% liquid by weight and still remain substantially solid.

Under ordinary conditions, the liquids do not separate from the solid material and a material having the advantages and characteristics of a solid can be produced over a considerable range of sulfur to metal ratios by forming the solid double chlorides of sulfur and metal in the presence of an excess of the chlorides of either sulfur or the metal or in the presence of other volatile liquid compounds.

In the production of the solid material with sulfur and titanium tetrachloride, increasing the relative amount of either sulfur or titanium in the starting materials will cause the product to take on a cheese-like consistency which can be easily extruded or pressed into shape. Further extremes in either the sulfur or titanium result in a product with a consistency like thick, heavy, almost dry paste, or the excess can be carried to an extent where the material is a muddy liquid. Thus, the consistency of the material may vary from a muddy liquid to a dry powdery material and intermediate between these extremes a heavy paste or a solid cheese-like product may be obtained.

The density of smoke and rate of smoke production varies with the titanium tetrachloride content. A muddy liquid or cheese-like material having a high rate of smoke production can be produced at one extreme by employing a large excess of titanium tetrachloride, and a material of substantially the same consistency can be produced having a relatively low rate of smoke production by employing a large excess of sulfur or sulfur chlorides. The solid materials between these extremes produce an intermediate smoke density and an intermediate period of smoke production. However, a solid material which has a rate of smoke production substantially equivalent to titanium tetrachloride can be produced and also a solid material having a rate of smoke production materially less than titanium tetrachloride can be produced. The period of smoke production varies substantially inversely with the rate of smoke production.

Examples of solid smoke producing material with a double sulfur and titanium chloride base are given in the following table:

| No. | #1 | #2 | #3 | #4 | #5 |
|---|---|---|---|---|---|
| Lbs. S per 100 lbs. TiCl$_4$ | 1.35 | 6.27 | 7.68 | 16.9 | 31.5. |
| Excess over amount for TiCl$_4$:SCl$_2$ | Ti | Ti | Ti | S | S. |
| Consistency | Heavy paste | Cheese-like | Dry powder | Dry powder | Heavy paste. |
| Density of smoke | About as TiCl$_4$ | Slightly less than #1. | Slightly less than #2. | Less than #3 | Less than #4. |
| Period of smoke | About as TiCl$_4$ | Greater than #1. | Greater than #2. | Greater than #3. | Greater than #4. |

In making the materials of the above examples, chlorine was bubbled through a mixture of liquid sulfur chlorides, predominantly, sulfur dichloride, and liquid titanium tetrachloride at a relatively low temperature, for example, room temperature. A constant amount of titanium tetrachloride was employed and the amount of sulfur chlorides varied. While the sulfur in the above examples was added as a liquid chloride consisting primarily of sulfur dichloride, elemental sulfur or sulfur monochloride may be employed as a starting material, as the chlorine combines with the sulfur or the lower sulfur chloride to form higher sulfur chlorides. As stated above, the solid materials forming the base of the resulting products is evidently a mixture of the double chlorides of sulfur and titanium having the formulae TiCl$_4$:SCl$_2$ and TiCl$_4$SCl$_4$. For example, analysis of product #2 of the above table shows approximately the following proportions:

$$11TiCl_4:2SCl_2:2SCl_4$$

which is equivalent to—

$$TiCl_4.36SCl_3$$

or $$TiCl_4.SCl_3 + 1.75TiCl_4$$

While an excess of sulfur chloride content reduces the rate of smoke formation and therefore the density of the smoke and increases the period of smoke formation, the sulfur content is not a mere diluent, as the sulfur chlorides present also assist in smoke formation. Such sulfur chlorides are also volatile and hydrolyzable in moist air to form hydrochloric acid, sulfur dioxide and colloidal sulfur.

A similar product may also be prepared by employing stannic chloride (SnCl$_4$) as the volatile metallic chloride instead of titanium tetrachloride. Stannic chloride is a volatile liquid and may be mixed with sulfur chlorides or with elemental sulfur and the resultant mixture saturated with chlorine in the same manner as described above to form a solid combination product including tin, sulfur and chlorine. A solid material formed by this method using 29.7 pounds of sulfur, in the form of sulfur monochloride and dichloride, per 100 pounds of SnCl$_4$ resulted in a combination product containing 12.85% sulfur, 67.45% chlorine and 19.70% tin. The resultant product was a dry solid, although the consistency of the product may be varied by varying the ratio of stannic chloride to sulfur, as is the case with titanium. Calculated to a molecular basis, the above analysis of the resulting tin-sulfur product might be represented by $$5SnCl_4:6SCl_2:6SCl_4$$

which is equivalent to SnCl$_4$.2.4SCl$_3$ or $$SnCl_4.SCl_3 - .7SnCl_2 - .7SnCl_4$$

The resulting product had an even greater rate of smoke production than SnCl$_4$ alone.

One or more of other volatile liquid materials such as VOCl$_3$, AsCl$_3$ or $$CH_2Br\overset{O}{\underset{\|}{C}}CH_3$$

can also be incorporated into the solid material by adding them to the mixture of metal chlorides, sulfur or sulfur chlorides reacted to solid form. The VOCl$_3$ will impart a dark color to the smoke screen; AsCl$_3$ will make it toxic and $$CH_2Br\overset{O}{\underset{\|}{C}}CH_3$$

will provide a tear gas admixed with the screen. Other materials having similar properties can likewise be added to vary the properties of the smoke screen in any desired manner. Relatively large amounts of such materials may be added, the upper limit being set by the amount of liquid which can be absorbed by the solid compounds. As stated before, the amount of liquid may, in many cases, be as much as 50% of the total and still result in a substantially solid product.

The double chlorides of tin or titanium with sulfur may also be prepared by the method disclosed in Patent 1,923,094, issued August 22, 1933, to Leslie G. Jenness. This method includes the passing of sulfur dichloride (SCl$_2$) in vapor form over titanium or tin oxides, for example, tin or titanium ores. The double chloride is formed and volatilised during the process. It is then condensed and no substantial excess of either metal chloride or sulfur chloride is present in the resultant product. This method of preparing the double chloride forms no part of the present invention.

The solid product of the present invention, when exposed to moist air, gives off a very dense cloud of smoke similar to that produced by titanium tetrachloride alone. It is entirely non-inflammable and can be prepared in solid form, thus eliminating the disadvantages of a liquid smoke producing agent. The process herein disclosed of making the solid product enables the rate of smoke production as well as the period of smoke production to be varied within wide limits. Also, the material can be produced with a wide range of consistencies, so that it may be used in powdered form or pressed into any desired shape. Furthermore, a solid smoke screen material having various properties such as toxic, color or tear gas properties can be produced. The method of production is extremely simple and easily controlled.

This application is a continuation in part of our copending application Serial No. 151,946, filed July 3, 1937.

While we have disclosed the preferred embodiments of our invention, it is to be understood that we are not to be limited to the details thereof, and that the invention may be varied within the scope of the following claims.

Having described the invention, we claim:

1. A substantially solid smoke screen material comprising a volatile liquid metallic chloride in chemical combination with a sulfur chloride and a substantial excess of one of said chlorides.

2. A substantially solid smoke screen material comprising titanium tetrachloride and a sulfur chloride in chemical combination and a substantial excess of one of said chlorides.

3. A substantially solid smoke screen material comprising stannic chloride and a sulfur chloride in chemical combination and a substantial excess of one of said chlorides.

4. The method of producing a solid smoke screen material, which comprises, mixing sulfur with a liquid volatile metallic chloride and passing chlorine through the resultant mixture to effect solidification thereof.

5. The method of producing a smoke screen material which comprises, mixing sulfur with titanium tetrachloride and passing chlorine through said mixture.

6. The method of producing a smoke screen material, which comprises, mixing sulfur with stannic chloride and passing chlorine through the resultant mixture.

7. The method of making a substantially solid smoke screen material including a double chloride of sulfur and a metal, which comprises, mixing sulfur with a volatile liquid metallic chloride and saturating said mixture with chlorine.

8. The process of forming a smoke screen, which comprises, exposing a solid material including a volatile liquid metallic chloride in chemical combination with a sulfur chloride to a moist atmosphere.

9. A substantially solid smoke screen material comprising a volatile solid double chloride of a metal and sulfur, containing a substantial amount of a volatile liquid absorbed therein.

10. A substantially solid smoke screen material comprising a volatile solid double chloride of titanium and sulfur, containing a substantial amount of a volatile liquid which modifies the properties of the smoke screen produced from said smoke screen material.

11. A substantially solid smoke screen material comprising a volatile chloride selected from the group consisting of titanium tetrachloride and stannic chloride in chemical combination with a sulfur chloride and a substantial excess of one of said chlorides.

12. A substantially solid smoke screen material comprising a volatile solid double chloride of tin and sulfur, containing a substantial amount of a volatile liquid absorbed therein which modifies the properties of the smoke screen produced from said smoke screen material.

13. A substantially solid smoke screen material comprising a volatile solid double chloride of a metal and sulfur, containing a substantial amount of a volatile liquid absorbed therein which colors the smoke screen produced from said smoke screen material.

14. A substantially solid smoke screen material comprising a volatile solid double chloride of a metal and sulfur, containing a substantial amount of vanadium oxychloride absorbed therein to color the smoke screen produced from said smoke screen material.

JAMES F. BOOKER.
ROGER L. ANNIS.